(12) United States Patent
Liu

(10) Patent No.: US 8,018,942 B2
(45) Date of Patent: Sep. 13, 2011

(54) RECOGNITION SYSTEMS BASED ON PATTERN MATCHING

(75) Inventor: Zhenyu Liu, Sichuan (CN)

(73) Assignee: O2Micro Inc., Santa Clara, CA (US)

( * ) Notice: Subject to any disclaimer, the term of this patent is extended or adjusted under 35 U.S.C. 154(b) by 0 days.

(21) Appl. No.: 12/347,292

(22) Filed: Dec. 31, 2008

(65) Prior Publication Data

US 2010/0166013 A1    Jul. 1, 2010

(51) Int. Cl.
*H04L 12/28* (2006.01)
(52) U.S. Cl. .............. 370/392; 370/471; 726/13
(58) Field of Classification Search .......... 370/389, 370/474, 466; 709/238, 240, 224; 726/22, 726/23
See application file for complete search history.

(56) References Cited

U.S. PATENT DOCUMENTS

| | | | | |
|---|---|---|---|---|
| 6,038,607 | A * | 3/2000 | Hamilton et al. | 709/236 |
| 6,798,777 | B1 * | 9/2004 | Ferguson et al. | 370/392 |
| 7,116,663 | B2 * | 10/2006 | Liao | 370/392 |
| 7,386,525 | B2 * | 6/2008 | Nurmela et al. | 706/47 |
| 7,567,567 | B2 * | 7/2009 | Muller et al. | 370/392 |
| 7,580,408 | B2 * | 8/2009 | Kendall | 370/392 |
| 7,639,618 | B2 * | 12/2009 | Bondi | 370/235 |
| 7,668,160 | B2 * | 2/2010 | Narayan et al. | 370/389 |
| 7,796,513 | B2 * | 9/2010 | Basso et al. | 370/230 |
| 2005/0063382 | A1 * | 3/2005 | Fenner | 370/389 |
| 2005/0108573 | A1 * | 5/2005 | Bennett et al. | 713/201 |
| 2005/0111446 | A1 * | 5/2005 | Greaves et al. | 370/389 |
| 2005/0278783 | A1 * | 12/2005 | Chien et al. | 726/22 |
| 2006/0007860 | A1 * | 1/2006 | Komisky | 370/230 |

OTHER PUBLICATIONS

"Optimization of Regular Expression Pattern Matching Circuits of FPGA" Lin, et al. Department of Computer Science, National Tsing Hua University, Hsinchu, Taiwan, 3-9810801-0-6/DateJun. 2006EDAA.
"Compiling PCRE to FPGA for Accelerating SNORT IDS" Mitra, et al. Department of Computer Science and Engineering University of California, Riverside Copyright 2007 ACM 978-1-59593-945-06/07/0012.
Chapter 10 English Summary of Object Oriented Network Protocols. China-pub.com Chapter 10 Chinese Summary of Object Oriented Network Protocols.

* cited by examiner

*Primary Examiner* — Michael J Moore, Jr.

(57) ABSTRACT

A recognition system for recognizing a data packet includes a data memory for storing data units in a predetermined order. A first data unit includes an instruction for determining a characteristic of the data packet. The first data unit also includes the total number of the data units, and a corresponding sequence number for the first data unit. The recognition system further includes a matching processor coupled to the data memory. The matching processor can execute the instruction in the first data unit to generate a result. The matching processor can also provide an address pointer according to the execution result, the total number of the data units, and the corresponding sequence number of the first data unit.

26 Claims, 5 Drawing Sheets

200

| MATCH MODE<br>202 | TRANSPORT LAYER PROTOCOL<br>204 |
|---|---|
| APPLICATION LAYER PROTOCOL<br>206 ||
| UNIT TOTAL NUMBER<br>208 ||
| UNIT SEQUENCE NUMBER<br>210 ||
| GROUP TOTAL NUMBER<br>212 | GROUP SEQUENCE NUMBER<br>214 |
| UNIT TOTAL NUMBER<br>216 | UNIT SEQUENCE NUMBER<br>218 |
| KEYWORD<br>220 ||
| OPTION<br>222_1 ||
| ⋮ ||
| OPTION<br>222_N ||

FIG. 2

RECOGNITION SYSTEMS BASED ON PATTERN MATCHING

BACKGROUND ART

Conventional protocol recognition systems can determine an application layer protocol (e.g., hypertext transfer protocol or HTTP, file transfer protocol or FTP, e-donkey protocol) of IP (Internet Protocol) packets based on a pattern matching process. For example, a conventional protocol recognition system can include a universal computer with pattern matching software. The universal computer can use the pattern matching software to compare the content of the IP packets with a set of patterns in the pattern matching software, so as to determine the protocol of the IP packets according to the result of the comparison. However, such conventional protocol recognition systems may not be able to determine the protocol of the IP packets fast enough.

In another example, a conventional protocol recognition system can be realized by a hardware circuit in an FPGA (field-programmable gate array). For example, an HDL (hardware description language) program such as a Verilog program for determining the protocol of the IP packets can be compiled to the hardware circuit. As such, the hardware circuit can process the IP packets so as to determine the protocol of the IP packets according to the HDL program. However, usually a relatively large FPGA is configured to load the hardware circuit, which can increase the size and the cost of the recognition system. Additionally, it would take a relatively long time to write the HDL program due to the complicated design of the hardware circuit. Moreover, any change to the patterns for the application layer protocol (e.g., HTTP, FTP, e-donkey protocol, BITTORRENT protocol, simple mail transfer protocol or SMTP), or any new protocol added to the Internet protocol suite, will need a programmer to re-write the HDL program, which would also take a relatively long time.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 2 illustrates a structure diagram of an example of a data unit, in accordance with one embodiment of the present invention.

SUMMARY

Figure 1:
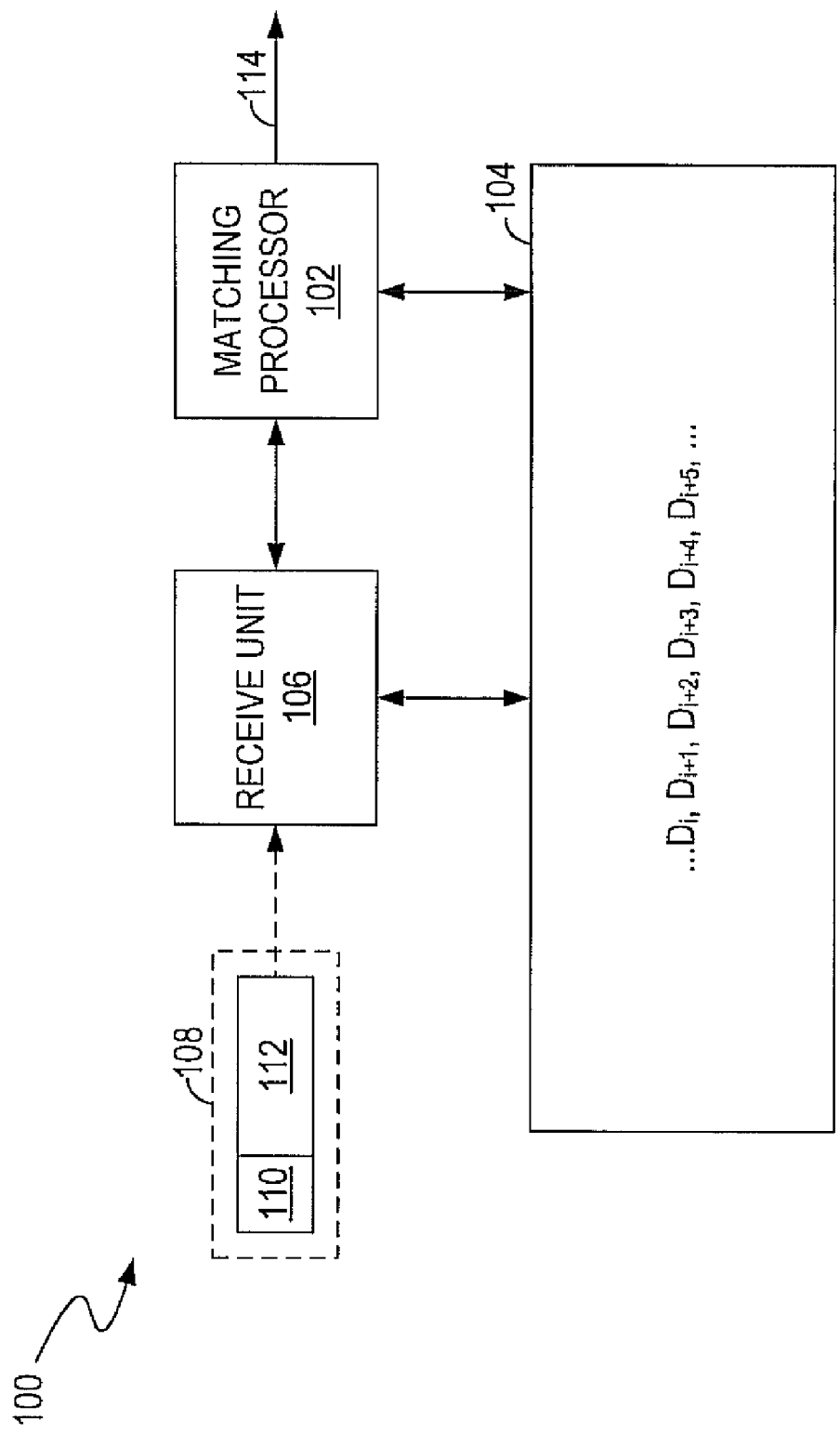
FIG. 1 illustrates a block diagram of an example of a recognition system, in accordance with one embodiment of the present invention.

In one embodiment, a recognition system for recognizing a data packet includes a data memory for storing data units in a predetermined order. A first data unit includes an instruction for determining a characteristic of the data packet. The first data unit also includes the total number of the data units and a corresponding sequence number for the first data unit. The recognition system further includes a pattern-matching processor coupled to the data memory. The matching processor can execute the instruction in the first data unit and generate a result of the execution. The matching processor can also provide an address pointer according to the execution result, the total number of the data units, and the corresponding sequence number for the first data unit.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "executing," "determining," "providing," "generating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Figure 4:
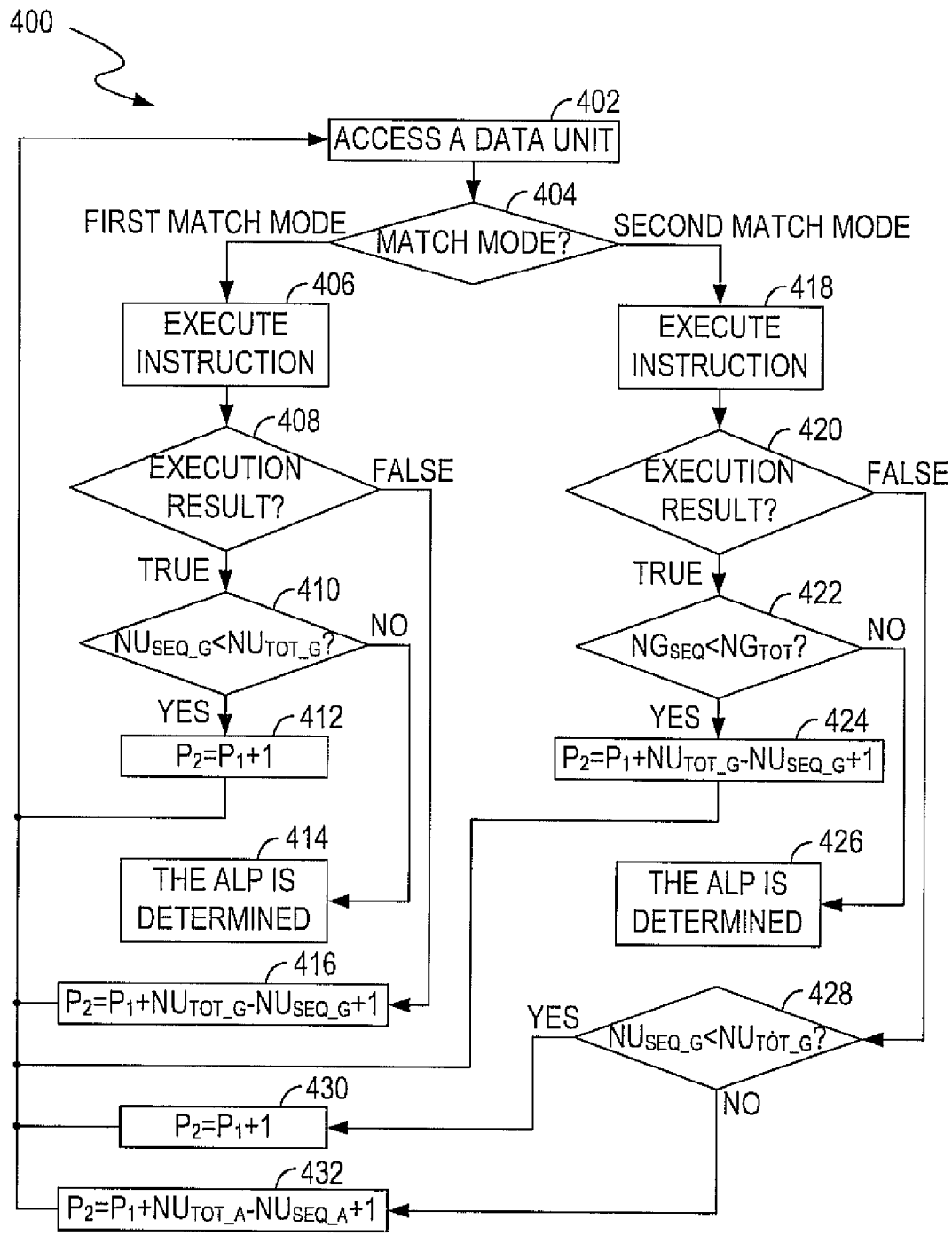
FIG. 4 illustrates a flowchart of examples of operations performed by a recognition system, in accordance with one embodiment of the present invention.
Figure 5:
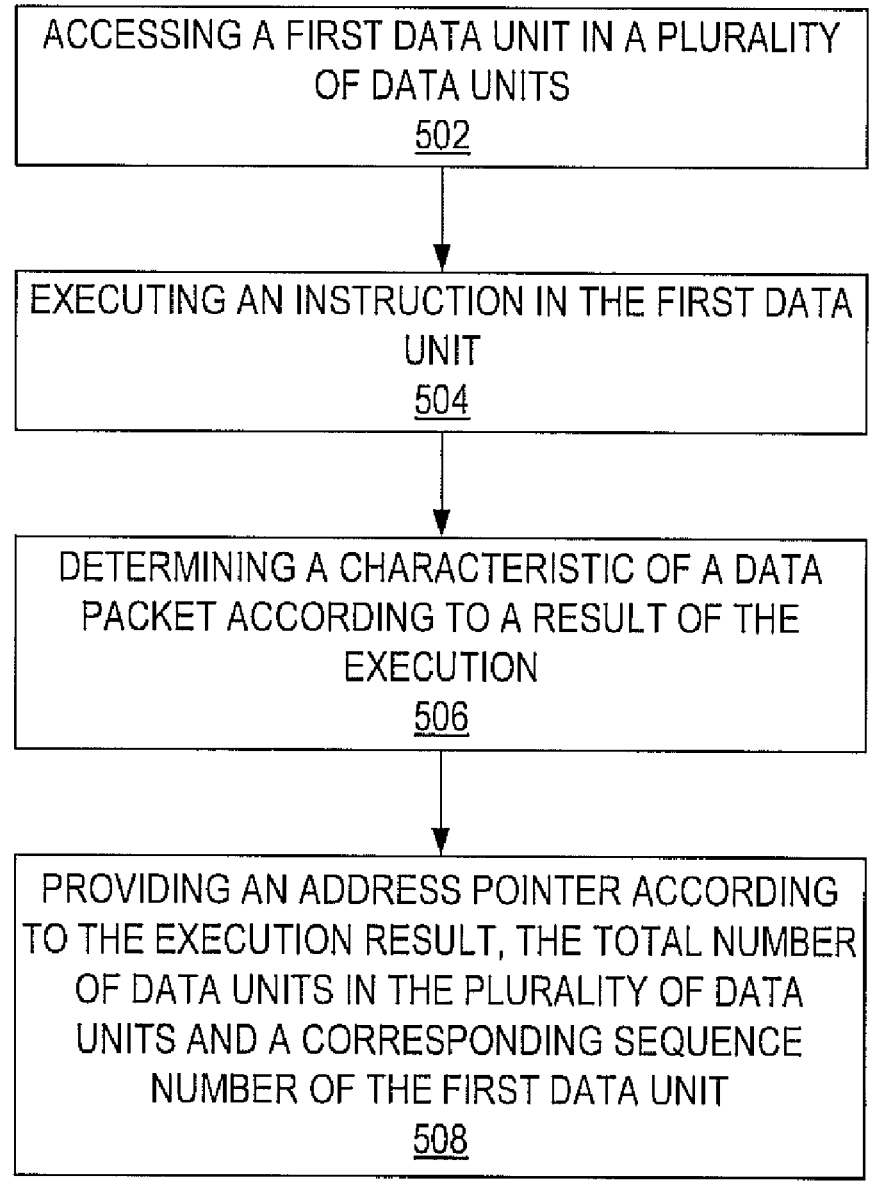
FIG. 5 illustrates a flowchart of examples of operations performed by a recognition system, in accordance with one embodiment of the present invention.

FIGS. 4 and 5 are flowcharts of examples of computer-implemented methods according to embodiments of the present invention. The flowcharts of FIGS. 4 and 5 can be implemented as computer-executable instructions residing on some form of computer-usable medium, such as program modules, executed by one or more computers or other devices.

In one embodiment, the present invention provides a recognition system. The recognition system can recognize a data packet by performing a pattern matching process. More specifically, in one embodiment, the data packet can include information that is packed into the data packet according to an Internet protocol, e.g., TLP (transport layer protocol), ALP (application layer protocol). Each Internet protocol can have one or more characteristics which can be transformed to one or more patterns. Such characteristic patterns can be stored in a data memory in a predetermined order. A pattern-matching processor can access the data memory and compare the data packet with the characteristic patterns stored in the data memory, so as to determine whether the data packet matches with the corresponding protocol according to the comparison. As such, the recognition system can recognize the protocol of the data packet.

FIG. 1 illustrates a block diagram of an example of a recognition system 100, in accordance with one embodiment of the present invention. The recognition system 100 can be used to recognize a data packet 108. In one embodiment, the data packet 108 can be, but is not limited to, an IP packet/datagram. The IP packet/datagram 108 can include a protocol field 110 for defining a TLP (transport layer protocol) of the IP packet 108 and a data field 112 for carrying the data of the IP packet 108. The TLP can include TCP (transmission control protocol), UDP (user datagram protocol), IGMP (Internet group management protocol), SCTP (stream control transmission protocol), etc.

In one embodiment, a data memory 104 can store multiple data units (e.g., shown as $D_i$, $D_{i+1}$, ... $D_{i+5}$, 'i' is an integer) in different areas of the data memory 104 according to different protocols. For example, the data memory 104 can be divided into one or more areas according to different TLPs. One of the areas can store data units relative to the TCP, one of the areas can store data units relative to the UDP, one of the areas can store data units relative to the IGMP, etc. Furthermore, each area relative to a corresponding TLP can be divided into several sub-areas according to different ALPs (application layer protocols). For example, for the area relative to TCP, a sub-area can store data units relative to HTTP (hypertext transfer protocol), a sub-area can store data units relative to SMTP (simple message transfer protocol), a sub-area can store data units relative to e-donkey protocol, etc.

In one embodiment, a receive unit 106 can be used to receive the IP packet 108, and determine the TLP of the IP packet 108 according to the content in the protocol field 110. As such, a pattern-matching processor 102 (hereinafter, matching processor 102) coupled to the receive unit 106 and the data memory 104 can access data units in a corresponding area of the data memory 104 according to the TLP of the IP packet 108. For example, after receiving the IP packet 108, the receive unit 106 can extract the content in the protocol field 110, such that the matching processor 102 can generate an address pointer that points to a begin data unit of the corresponding area according to the content, so as to access the begin data unit. Additionally, the receive unit 106 can extract the application layer data from the IP data field 112 and store the application layer data into a data buffer of the receive unit 106. The matching processor 102 can determine an ALP of the IP packet 108 according to the data units in the corresponding area and the application layer data in the data buffer.

More specifically, an ALP can have one or more characteristics, and there can be a logical relationship among the characteristics. For example, if the ALP of the IP packet 108 is the e-donkey protocol, the IP packet 108 can match a first characteristic group $CG_1$ and a second characteristic group $CG_2$. The first characteristic group $CG_1$ can include four characteristic units respectively represented by 'P', 'Q', 'R' and 'S'. The first characteristic unit P can indicate a characteristic, that is, the content in the first byte of the application layer data field of the IP data field 112 includes a hexadecimal number 0xE3. The second characteristic unit Q can indicate a characteristic, that is, the content in the first byte includes a hexadecimal number 0xC5. The third characteristic unit R can indicate a characteristic, that is, the content in the first byte includes a hexadecimal number 0xE4. The fourth characteristic unit S can indicate a characteristic, that is, the content in the first byte includes a hexadecimal number 0xD4. In one embodiment, the first characteristic group $CG_1$ can be expressed as $P \vee Q \vee R \vee S$. In other words, if the IP packet 108 matches one of the characteristic units P, Q, R and S, it can indicate that the IP packet 108 matches the characteristic group $CG_1$. For the second characteristic group $CG_2$, it can include a fifth characteristic unit represented by 'T'. The fifth characteristic unit T can indicate a characteristic, that is, the content in the second to fifth bytes of the application layer data field includes hexadecimal numbers indicative of the length of the IP packet 108. In one embodiment, the second characteristic group $CG_2$ can be expressed as T. Similarly, if the IP packet 108 matches the characteristic unit T, the IP packet 108 matches the characteristic group $CG_2$. In one embodiment, if the IP packet 108 matches both of the characteristic groups $CG_1$ and $CG_2$, the ALP of the IP packet 108 is the e-donkey protocol. As such, the logical relationship among the characteristics of the e-donkey protocol can be expressed as $(P \vee Q \vee R \vee S) \wedge T$, or $CG_1 \wedge CG_2$.

In one embodiment, the logical relationship among the characteristics can also be expressed as $(P \wedge T) \vee (Q \wedge T) \vee (R \wedge T) \vee (S \wedge T)$. In one such embodiment, the e-donkey protocol can include four characteristic groups. A first characteristic group $CG'_1$ can be expressed as $P \wedge T$. A second characteristic group $CG'_2$ can be expressed as $Q \wedge T$. A third characteristic group $CG'_3$ can be expressed as $R \wedge T$. A fourth characteristic group $CG'_4$ can be expressed as $S \wedge T$. If the IP packet 108 matches the characteristic units P and T, then the IP packet 108 matches the characteristic group $CG'_1$; if the IP packet 108 matches the characteristic units Q and T, then the IP packet 108 matches the characteristic group $CG'_2$; and so on for the characteristic groups $CG'_3$ and $CG'_4$. In one embodiment, if the IP packet 108 matches one of the characteristic groups $CG'_1, \ldots CG'_4$, the ALP of the IP packet 108 is the e-donkey protocol. As such, the logical relationship among the characteristics of the e-donkey protocol can also be expressed as $CG'_1 \vee CG'_2 \vee CG'_3 \vee CG'_4$, in one embodiment.

In one embodiment, at least one data unit of the plurality of data units (e.g., $D_i, D_{i+1}, \ldots D_{i+5}$) can indicate a corresponding characteristic (e.g., P, Q, R, S, T) of an ALP. For example, the data unit $D_{i+1}$ can include an instruction for comparing the content in the aforementioned first byte with the value 0xE3. The matching processor 102 can access the data unit $D_{i+1}$ and execute the instruction, and generate an execution result indicative of whether the data packet 108 has the corresponding characteristic P. Similarly, the data units $D_{i+2}, \ldots D_{i+5}$ respectively can be used to determine whether the data packet 108 has the characteristics Q, R, S and T.

In one embodiment, the data units $D_{i+1}, \ldots D_{i+5}$ can be stored in the data memory 104 as a plurality of characteristic patterns for the pattern matching process of the data packet 108. The data units $D_{i+1}, \ldots D_{i+5}$ can be stored in the data memory 104 in a predetermined order which is determined by the logical relationship of the characteristics, in one embodiment. For example, for the e-donkey protocol, the logical combination of the characteristics can be $(P \vee Q \vee R \vee S) \wedge T$, such that the set of data units $D_{i+1}, \ldots D_{i+4}$ respectively indicative of P, Q, R and S can be stored sequentially, and the data unit $D_{i+5}$ indicative of T can be stored next to the set of data units $D_{i+1}, \ldots D_{i+4}$, in one embodiment. In one such embodiment, the data units $D_{i+1}, \ldots D_{i+5}$ can be stored in a sub-area relative to the e-donkey protocol. Moreover, as stated above, the logical combination of the characteristics can also be $(P \wedge T) \vee (Q \wedge T) \vee (R \wedge T) \vee (S \wedge T)$. As such, in another embodiment, a set of data units $D_{j+1}, \ldots D_{j+8}$ ('j' is an integer) can be set to represent the characteristic sequence P, T, Q, T, R, T, S and T, and can be stored sequentially in a sub-area relative to the e-donkey protocol.

Generally speaking, in one embodiment, the recognition system 100 for recognizing the data packet 108 can include the data memory 104 for storing a set of data units in a predetermined order. A first data unit in the set of data units can include an instruction for determining a characteristic of the data packet 108. The first data unit can also include the total number of data units in the set of data units and a corresponding sequence number for the first data unit. In addition, the recognition system 100 can include a matching processor 102 coupled to the data memory 104. The matching processor 102 can execute the instruction in the first data unit and generate a result of the execution. In one embodiment, the execution result of the instruction includes a Boolean value. If the Boolean value is true, the data packet 108 has the characteristic indicated by the first data unit. If the Boolean value is false, the data packet 108 doesn't have the characteristic indicated by the first data unit. Moreover, the matching processor 102 can provide an address pointer $P_{add}$ according to the execution result, the total number of data units in the set of data units, and the corresponding sequence number for the first data unit. In one embodiment, the matching processor 102 can access a second data unit in the data memory 104 according to the address pointer $P_{add}$ and execute an instruction in the second data unit.

Similarly, the matching processor 102 can provide another address pointer that points to a third data unit according to the execution result of the instruction in the second data unit, a total number and a sequence number stored in the second data unit. As such, the matching processor 102 can access the third data unit, a fourth data unit, a fifth data unit, etc., one by one, and determine whether the data packet 108 has the corresponding characteristic indicated by the accessed data unit. In other words, the matching processor 102 can perform the pattern matching process based on the data units in the data memory 104, so as to determine the ALP of the data packet 108. In one embodiment, if the data packet 108 matches a logical combination of characteristics of an ALP, the matching processor 102 can generate an output signal 114 to indicate that such ALP is the ALP of the data packet 108.

FIG. 2 illustrates an example of a structure diagram of a data unit 200, in accordance with one embodiment of the present invention. FIG. 2 is described in combination with FIG. 1. In one embodiment, each data unit of data units $D_i, \ldots D_{i+5}$, can have the same structure of the data unit 200, and have the same length (e.g., 32 bytes).

As shown in FIG. 2, the data unit 200 can include a match mode field 202 for representing a pattern match mode for a corresponding ALP. More specifically, in one embodiment, the pattern match modes can include a first match mode and a second match mode. In the first match mode, the logical relationship among characteristic groups in the corresponding ALP can be logical OR, e.g., $CG'_1 \vee CG'_2 \vee CG'_3 \vee CG'_4$, and the logical relationship among characteristic units in each characteristic group can be logical AND, e.g., $P \wedge T, Q \wedge T, R \wedge T$ and $S \wedge T$, in one embodiment. In the second match mode, the logical relationship among characteristic groups in the corresponding ALP can be logical AND, e.g., $CG_1 \wedge CG_2$, and the logical relationship among characteristic units in each characteristic group can be logical OR, e.g., $P \vee Q \vee R \vee S$, in one embodiment.

Taking the e-donkey protocol as an example, a sub-area relative to the e-donkey protocol can include a set of data units $D_{j+1}, D_{j+2}, \ldots D_{j+8}$. The set of data units $D_{j+1}, D_{j+2}, \ldots D_{j+8}$ can be stored in the data memory 104 sequentially, and can be set to represent the characteristic units P, T, Q, T, R, T, S and T respectively. In one such example, match mode field 202 of each data unit $D_{j+1}, D_{j+2}, \ldots D_{j+8}$ can have the same content representing the first match mode. As such, the matching processor 102 can perform the pattern matching process according to data units $D_{j+1}, D_{j+2}, \ldots D_{j+8}$, so as to determine whether the data packet 108 matches the logical combination of $(P \wedge T) \vee (Q \wedge T) \vee (R \wedge T) \vee (S \wedge T)$.

As another example, the sub-area relative to the e-donkey protocol can include a set of data units $D_{i+1}, D_{i+2}, \ldots D_{i+5}$. The set of data units $D_{i+1}, D_{i+2}, \ldots D_{i+5}$ can be stored in the data memory 104 sequentially, and can be set to represent the characteristic units P, Q, R, S and T respectively. In one such example, match mode field 202 of each data unit $D_{i+1}, D_{i+2}, \ldots D_{i+5}$ can have the same content representing the second match mode. As such, the matching processor 102 can perform the pattern matching process according to data units $D_{i+1}, D_{i+2}, \ldots D_{i+5}$, so as to determine whether data packet 108 matches the logical combination of $(P \vee Q \vee R \vee S) \wedge T$.

In one embodiment, the data unit 200 can also include a TLP field 204 for representing a TLP (e.g., TCP, UDP, IGMP, SCTP) relative to a corresponding area where the data unit 200 is located. In one embodiment, the recognition system 100 can determine the TLP of the data packet 108 according to the protocol field 110 in the data packet 108. As such, the matching processor 102 can perform the pattern matching process based on the data units stored in the corresponding area.

In one embodiment, the data unit 200 can also include an ALP field 206 for representing an ALP (e.g., HTTP, FTP, e-donkey protocol, BITTORRENT protocol, SMTP) relative to a corresponding sub-area where the data unit 200 is located. In addition, the data unit 200 can include a unit total number field 208 for storing the total number $NU_{tot\_a}$ of data units in the corresponding sub-area, and a unit sequence number field 210 for storing a corresponding sequence number $NU_{seq\_a}$ for the data unit 200. In one embodiment, $NU_{tot\_a}$ and $NU_{seq\_a}$ can be positive integers, and $NU_{seq\_a}$ is no greater than $NU_{tot\_a}$. For the example of the e-donkey protocol, if the first match mode is selected, the sub-area relative to the e-donkey protocol can include eight (8) characteristic units P, T, Q, T, R, T, S and T, such that the number $NU_{tot\_a}$ can be 8. Additionally, the sequence numbers $NU_{seq\_a}$ of data units respectively indicative of P, T, Q, T, R, T, S and T can be 1, 2, 3, 4, 5, 6, 7 and 8. On the other hand, if the second match mode is selected, the sub-area relative to the e-donkey protocol can include five (5) characteristic units P, Q, R, S and T, such that the number $NU_{tot\_a}$ can be 5. Additionally, the sequence numbers $NU_{seq\_a}$ of data units respectively indicative of P, Q, R, S and T can be 1, 2, 3, 4 and 5.

In one embodiment, the pattern matching mode, e.g., the first and second matching modes, is optional according to the total number $NU_{tot\_a}$ of data units for the corresponding ALP. For example, in the first match mode, the unit total number $NU_{tot\_a}$ of the e-donkey protocol can be eight. In the second match mode, the unit total number $NU_{tot\_a}$ can be five, therefore the number of data units for the second mode is less than the number for the first mode. As such, the second match mode can be, but does not have to be, selected for the pattern matching process.

Moreover, in one embodiment, the data unit 200 includes a group total number field 212 for storing the total number $NG_{tot}$ of characteristic groups for the corresponding ALP, and a group sequence number field 214 for storing a corresponding sequence number $NG_{seq}$ for the characteristic group. In one embodiment, $NG_{tot}$ and $NG_{seq}$ can be positive integers, and $NG_{seq}$ is no greater than $NG_{tot}$. For the first match mode, the e-donkey protocol can have four (4) characteristic groups $CG'_1$, $CG'_2$, $CG'_3$, and $CG'_4$, therefore $NG_{tot}$ can be 4. The group sequence numbers $NG_{seq}$ of the characteristic groups $CG'_1$, $CG'_2$, $CG'_3$ and $CG'_4$ can be 1, 2, 3 and 4 respectively. For the second match mode, the e-donkey protocol can have two (2) characteristic groups $CG_1$ and $CG_2$ ($NG_{tot}$=2), and the group sequence numbers $NG_{seq}$ of characteristic groups $CG_1$ and $CG_2$ can be 1 and 2 respectively.

Furthermore, in one embodiment, the data unit 200 includes a unit total number field 216 for storing the total number $NU_{tot\_g}$ of characteristic units (data units) in the corresponding characteristic group, and a unit sequence number field 218 for storing a corresponding sequence number $NU_{seq\_g}$ for the data unit 200 within the corresponding characteristic group. In one embodiment, $NU_{tot\_g}$ and $NU_{seq\_g}$ can be positive integers, and $NU_{seq\_g}$ is no greater than $NU_{tot\_g}$. For example, $CG_1$ includes four units P, Q, R and S, therefore the number $NU_{tot\_g}$ of $CG_1$ can be 4. Additionally, the sequence number $NU_{seq\_g}$ of data units respectively indicative of P, Q, R and S can be 1, 2, 3 and 4. For one more example, $CG'_2$ includes two units Q and T, therefore the number $NU_{tot\_g}$ of $CG'_2$ can be 2. Additionally, the sequence number $NU_{seq\_g}$ of data units respectively indicative of Q and T can be 1 and 2.

In one embodiment, an instruction in the data unit 200 includes a keyword representative of the instruction in an instruction set. In one embodiment, the instruction further includes at least one parameter for the execution of the instruction. As shown in FIG. 2, the keyword can be stored in a keyword field 220 and the at least one parameter can be stored in one or more option fields 222_1-222_N (N is a positive integer).

More specifically, the instruction set can include a set of instructions having predetermined functions respectively. For example, the set of instructions can be indicated by keywords such as 'content', '>content', '<content', '+al', etc. The instructions of 'content', '>content' and '<content' can be operable for comparing a content in a predetermined area in the data buffer of the receive unit 106 with a predetermined content. Correspondingly, the option field 222_1 can store the begin address of the predetermined area; the option field 222_2 can store a depth of the predetermined area; and the option field 222_3 can store the predetermined content. In addition, the comparison result of the instruction 'content' can indicate whether the content in the predetermined area is the same as the predetermined content. The comparison result of the instruction '>content' can indicate whether the content in the predetermined area is greater than the predetermined content. The comparison result of the instruction '<content' can indicate whether the content in the predetermined area is less than the predetermined content. The instruction '+al' can be operable for adding a value stored in a first predetermined area in the data buffer to a predetermined value, and for storing the sum into a second predetermined area in the data buffer. Correspondingly, the option fields 222_1 and 222_2 can store the begin address and depth of the first predetermined area; the option fields 222_3 and 222_4 can store the begin address and depth of the second predetermined area; and the option field 222_5 can store the predetermined value.

The instructions in the instruction set can have many different functions, such as content comparison, simple mathematical operation, logical operation, address pointer jumping, etc. After accessing the data unit 200, the matching processor 102 can execute a corresponding instruction of the instruction set according to a keyword in the keyword field 220 and parameters in the option fields 222_1-222_N. In one embodiment, the matching processor 102 can determine whether the data packet 108 includes a characteristic by executing a corresponding instruction of the instructions.

Figure 3:
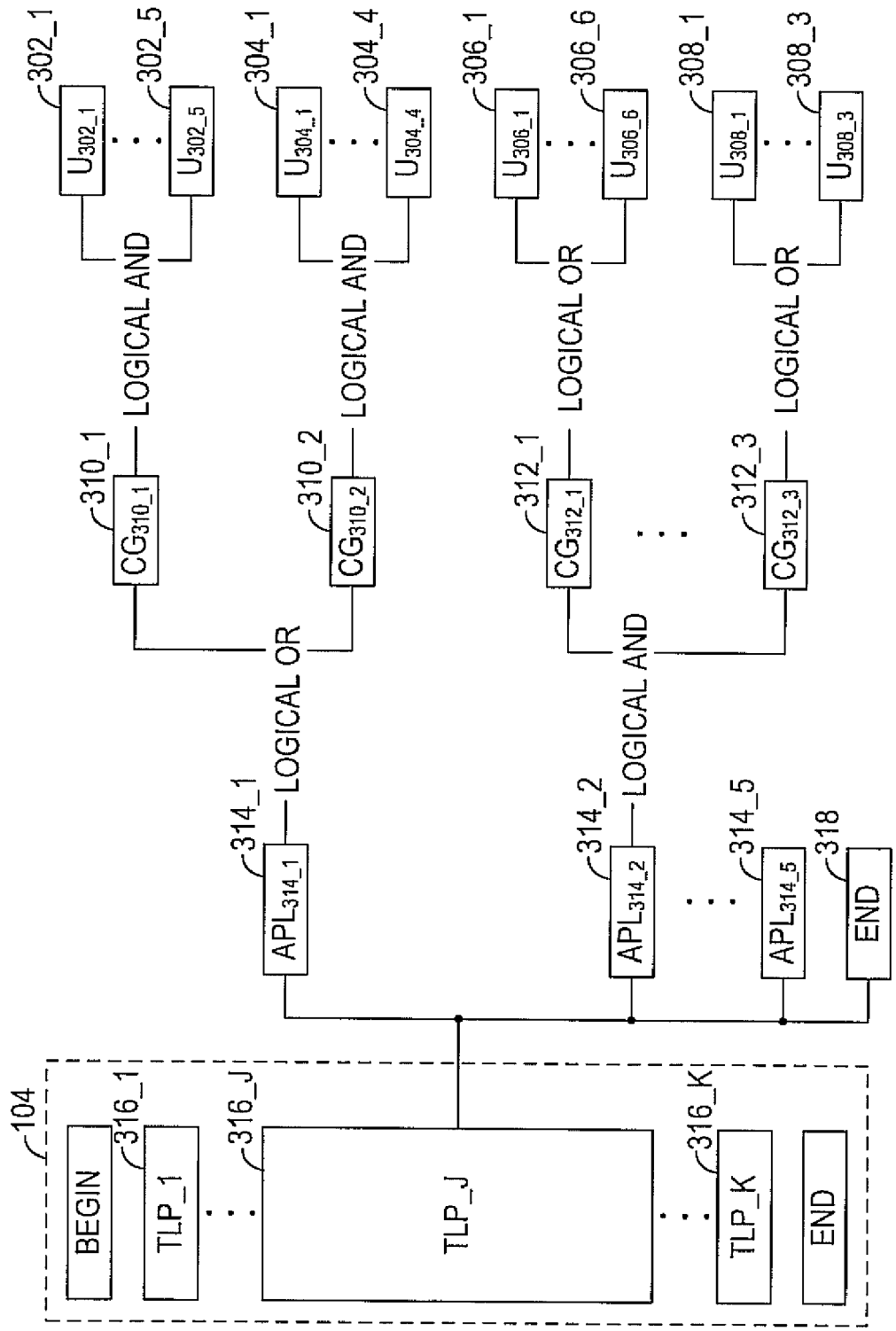
FIG. 3 illustrates a distribution diagram of examples of data units in a data memory, in accordance with one embodiment of the present invention.

FIG. 3 illustrates an example of a distribution diagram of data units in the data memory 104, in accordance with one embodiment of the present invention. FIG. 3 is described in combination with FIG. 1 and FIG. 2. As shown in FIG. 3, the data memory 104 can include multiple areas 316_1-316_K (K is a positive integer) respectively relative to transport layer protocols TLP_1-TLP_K, e.g., TCP, UDP, IGMP, SCTP, etc. In one embodiment, each area 316_1-316_K includes a set of sub-areas respectively relative to a set of ALPs, e.g., HTTP, FTP, e-donkey protocol, BITTORRENT protocol, SMTP, etc. For example, the area 316_J for TLP_J (J<K) can include sub-areas 314_1-314_5 respectively relative to application layer protocols $ALP_{314\_1}$, . . . $ALP_{314\_5}$. The sub-areas 314_1-314_5 can be located in the data memory 104 sequentially.

In one embodiment, each ALP includes one or more characteristic groups. In the example of FIG. 3, the $ALP_{314\_1}$ in the sub-area 314_1 includes groups $CG_{310\_1}$ and $CG_{310\_2}$ stored in sub-areas 310_1 and 310_2; and the $ALP_{314\_2}$ in the sub-area 314_2 includes groups $CG_{312\_1}, \ldots CG_{312\_3}$ stored in sub-areas 312_1-312_3. In one embodiment, each characteristic group can include one or more characteristic units. For example, the group $CG_{310\_1}$ includes characteristic units $U_{302\_1}, \ldots U_{302\_5}$ represented by data units 302_-302_5; the group $CG_{310\_2}$ includes characteristic units $U_{304\_1}, \ldots U_{304\_4}$ represented by data units 304_1-304_4; the group $CG_{312\_1}$ includes characteristic units $U_{306\_1}, \ldots U_{306\_6}$ represented by data units 306_1-306_6; and the group $CG_{312\_3}$ includes characteristic units $U_{308\_1}, \ldots U_{308\_3}$ represented by data units 308_1-308_3.

As stated above, an ALP can include a set of characteristics which can be indicated by a set of data units. The matching processor 102 can perform the pattern matching process according to the set of data units by the first match mode or the second match mode. In the example of FIG. 3, for the $ALP_{314\_1}$, the first match mode is selected. In other words, the logical combination of the characteristics of the $ALP_{314\_1}$ can be: $(U_{302\_1} \wedge U_{302\_2} \ldots \wedge U_{302\_5}) \vee (U_{304\_1} \wedge U_{304\_2} \ldots \wedge U_{304\_4})$ or $CG_{310\_1} \vee CG_{310\_2}$. For the $ALP_{314\_2}$, the second match mode is selected. In other words, the logical combination of the characteristics of the $ALP_{314\_2}$ can be: $(U_{306\_1} \vee U_{306\_2} \ldots \vee U_{306\_6}) \ldots \wedge (U_{308\_1} \vee U_{308\_3})$ or $CG_{312\_1} \wedge CG_{312\_2} \wedge CG_{312\_3}$. In one embodiment, the data units 302_1-302_5, 304_1-304_4, 306_1-306_6, ..., 308_1-308_3 are stored in the data memory 104 sequentially.

In one embodiment, the aforementioned first data unit can be a data unit located in the area 314_1. For example, if the first data unit is one of the set of data units 302_1-302_4, and the corresponding execution result has a Boolean value that is true, the aforementioned address pointer $P_{add}$ can be provided to point to a second data unit 302_2-302_5 stored next to the first data unit. As another example, if the first data unit is the last data unit 302_5 in the characteristic group $CG_{310\_1}$, and the corresponding execution result is true, it can indicate that the data packet 108 matches the characteristic group $CG_{310\_1}$ ($CG_{310\_1} = U_{302\_1} \wedge U_{3022} \ldots \wedge U_{302\_5}$). As such, the ALP of the data packet 108 can be the $ALP_{314\_1}$. The matching processor 102 thus can generate an output signal 114 indicating that the ALP of the data packet 108 is the $ALP_{314\_1}$.

As another example, if the first data unit is one of the set of data units 302_1-302_5, and the corresponding execution result has a Boolean value that is false, it can indicate that the data packet 108 does not match the characteristic group $CG_{310\_1}$. As such, the address pointer $P_{add}$ can be provided to point to a second data unit 304_1 stored next to the set of data units 302_1-302_5.

In another embodiment, the first data unit can be located in the area 314_2. For example, if the first data unit is one of the set of data units 306_1-306_5, and the corresponding execution result has a Boolean value that is false, the address pointer $P_{add}$ can be provided to point to a second data unit 306_2-306_6 stored next to the first data unit. As another example, if the first data unit is data unit 306_6 and the corresponding execution result is false, it can indicate that the data packet 108 does not match the characteristic group $CG_{312\_1}$ ($CG_{312\_1} = U_{306\_1} \vee U_{306\_2} \ldots \vee U_{306\_6}$). As such, it can determine that the ALP of the data packet 108 is not the $ALP_{314\_2}$, and the address pointer $P_{add}$ can be provided to point to a second data unit, e.g., a begin data unit of the sub-area 314_3, that is stored next to the plurality of data units (e.g., 306_1-306_6, ... 308_1-308_3) of the sub-area 314_2.

As another example, if the first data unit is one of the set of data units 306_1-306_6, and the corresponding execution result has a Boolean value that is true, it can indicate that the data packet 108 matches the characteristic group $CG_{312\_1}$. As such, the address pointer $P_{add}$ can be provided to point to a second data unit stored next to the set of data units 306_1-306_6, e.g., the begin data unit of the characteristic group $CG_{312\_2}$. However, for another example, if the first data unit is one of the set of data units 308_1-308_3 which is the last characteristic group $CG_{312\_3}$ of the sub-area 314_2, and the corresponding execution result is true, it can indicate that the data packet 108 matches all the characteristic groups $CG_{312\_1}, \ldots CG_{312\_3}$. As such, the ALP of the data packet 108 can be the $ALP_{314\_2}$. The matching processor 102 thus can generate an output signal 114 indicating that the ALP of the data packet 108 is the $ALP_{314\_2}$.

Furthermore, in one embodiment, each area 316_1-316_K can include an end data unit for representing the end of the corresponding area 316_1-316_K. For example, as shown in FIG. 3, an end data unit 318 of the area 316_J can include an instruction for terminating the pattern matching process. In one embodiment, if the address pointer $P_{add}$ points to the end data unit 318, the matching processor 102 can access the end data unit 318 and then terminate the pattern matching process. The matching processor 102 can also generate an output signal 114 indicating that the data packet 108 does not match any ALP of TLP_J.

FIG. 4 illustrates a flowchart 400 of examples of operations performed by a recognition system, in accordance with one embodiment of the present invention. In one embodiment, the matching processor 102 can be configured, such that the recognition system 100 can operate in a way shown in the flowchart 400. FIG. 4 is described in combination with FIG. 1, FIG. 2 and FIG. 3.

In block 402, the matching processor 102 can access a first data unit (e.g., 302_1-302_5, 304_1-304_4, 306_1-306_6, 308_1-308_3, etc.) according to a first address pointer $P_1$ that points to the first data unit. In one embodiment, the first data unit can have the same structure of the data unit 200. In block 404, the matching processor 102 can determine which match mode is selected for the pattern matching process. More specifically, the content in the match mode field 202 of the first data unit can indicate a match mode (e.g., the aforementioned first and second match modes) for the pattern matching process. If the first match mode is selected, the flowchart 400 goes to block 406.

In block 406, the matching processor 102 can execute an instruction (e.g., stored in the keyword field 220 and the option fields 222_1-222_N) in the first data unit. In one embodiment, the execution result of the instruction includes a Boolean value. In block 408, if the execution result is true, which can indicate that the data packet 108 matches the characteristic represented by the first data unit, the flowchart 400 goes to block 410. In block 410, the matching processor 102 can compare the total number $NU_{tot\_g}$ stored in the unit total number field 216 with the sequence number $NU_{seq\_g}$ stored in the unit sequence number field 218. In one embodiment, the first data unit can be within a first characteristic group (e.g., a set of data units). The first characteristic group can include $NU_{tot\_g}$ data units and the sequence number of the first data unit can be $NU_{seq\_g}$. If the sequence number $NU_{seq\_g}$ is less than the total number $NU_{tot\_g}$, it can indicate that the first data unit is not the last data unit of the first characteristic group, such that the flowchart 400 goes to block 412. In block 412, the matching processor 102 can provide a second address pointer $P_2$ pointing to a second data unit, and the address pointer $P_2$ can be given by: $P_2 = P_1 + 1$. More specifically, the first address pointer $P_1$ is added by a relative offset of a length of one data unit (e.g., 32 bytes). As such, the flowchart 400 can go to block 402, and the matching processor 102 can access the second data unit that is stored next to the first data unit.

Returning to block 410, if the sequence number $NU_{seq\_g}$ is equal to the total number $NU_{tot\_g}$, it can indicate that the first data unit is the last data unit of the first characteristic group, such that the flowchart 400 goes to block 414. In block 414, the ALP of the data packet 108 is determined. More specifically, since the match mode is the first match mode, the logical relationship among characteristic groups within the corresponding ALP is logical OR, and the logical relationship among characteristic units within each characteristic group is logical AND. When the first data unit is the last data unit of the first characteristic group, it can indicate the data packet 108 matches the first characteristic group. As such, the matching processor 102 can determine the ALP of the data packet 108 according to the content in the ALP field 206 of the first data unit. In other words, the ALP of the data packet 108 is the ALP represented by the ALP field 206 of the first data unit.

Returning to block 408, if the execution result is false, which can indicate that the data packet 108 does not have the characteristic represented by the first data unit, the flowchart 400 goes to block 416. In block 416, the second address pointer $P_2$ is provided, and can be given by: $P_2=P_1+NU_{tot\_r}-NU_{seq\_r}+1$. More specifically, in one embodiment, the first address pointer $P_1$ can be added by a relative offset of a length of $NU_{tot\_r}-NU_{seq\_r}+1$ data units, e.g., $(NU_{tot\_r}-NU_{seq\_r}+1)*(32 bytes)$. As such, the flowchart 400 can go to block 402, and the matching processor 102 can access a second data unit that is stored next to the first characteristic group.

Returning to block 404, if the second match mode is selected, the flowchart 400 goes to block 418 to execute the instruction in the first data unit. In block 420, if the execution result is true, the flowchart 400 goes to block 422. In block 422, the matching processor 102 can compare the group total number $NG_{tot}$ stored in the group total number field 212 with the group sequence number $NG_{seq}$ stored in the group sequence number field 214. In one embodiment, the first characteristic group can be within a corresponding ALP. The ALP can include $NG_{tot}$ characteristic groups, and the sequence number of the first characteristic group can be $NG_{seq}$. In the second match mode, the logical relationship among characteristic groups within the ALP is logical AND, and the logical relationship among characteristic units within each characteristic group is logical OR. If the sequence number $NG_{seq}$ is less the total number $NG_{tot}$, it can indicate that the first characteristic group is not the last characteristic group of the ALP, such that the flowchart 400 goes to block 424. In block 424, the second address pointer $P_2$ is provided, and can be given by: $P_2=P_1+NU_{tot\_r}-NU_{seq\_r}+1$. As such, the flowchart 400 can go to block 402, and the matching processor 102 can access a second data unit that is stored next to the first characteristic group.

Returning to block 422, if the sequence number $NG_{seq}$ is equal to the total number $NG_{tot}$, it can indicate that the first characteristic group is the last characteristic group of the corresponding ALP, such that flowchart goes to block 426. In block 426, the ALP of the data packet 108 is determined. More specifically, when the first characteristic group is the last characteristic group of the ALP, it can indicate the data packet 108 matches all the characteristic groups of the ALP. As such, the matching processor 102 can determine the ALP of the data packet 108 according to the content in the ALP field 206 of the first data unit.

Returning to block 420, if the execution result is false, the flowchart 400 goes to block 428. In block 428, the matching processor 102 can compare the total number $NU_{tot\_g}$ with the sequence number $NU_{seq\_g}$. If the sequence number $NU_{seq\_g}$ is less than the total number $NU_{tot\_g}$, the flowchart 400 goes to block 430. Similarly to block 412, the second address pointer $P_2$ is provided, and can be given by: $P_2=P_1+1$. If the sequence number $NU_{seq\_g}$ is equal to the total number $NU_{tot\_g}$, it can indicate that the data packet 108 does not match the first characteristic group. In other words, the ALP of the data packet 108 is not the ALP relative to the sub-area where the first characteristic group is located. As such, the flowchart 400 goes to block 432 to access a second data unit in an area of another ALP.

More specifically, in block 432, the second address pointer $P_2$ is provided, and can be given by: $P_2=P_1+NU_{tot\_a}-NU_{seq\_a}+1$, where $NU_{tot\_a}$ is the unit total number stored in the unit total number field 208, and $NU_{seq\_a}$ is the unit sequence number stored in the unit sequence number field 210. In one embodiment, the total number of characteristic units (data units) in the sub-area relative to the corresponding ALP can be $NU_{tot\_a}$, and the sequence number of the first data unit within the sub-area can be $NU_{seq\_a}$. As such, the matching processor 102 can access a second data unit that is stored next to the sub-area.

In other words, in one embodiment, the data memory 104 can be used to provide a plurality of instructions. The instructions can be stored in a plurality of data units, e.g., 302_1-302_5, 304_1-304_4, 306_1-306_6, 308_1-308_3, etc. As such, the instructions can be stored in the data memory 104 in a predetermined order that is determined by a logical relationship of the instructions, e.g., the logical relationship of the corresponding data units. The instructions are operable for determining a plurality of characteristics of the data packet 108 respectively. Moreover, the matching processor 102 coupled to the data memory 104 can execute a first instruction of the plurality of instructions and generate a result of the execution. The matching processor 102 can generate an instruction pointer according to the execution result, the total number of instructions in the plurality of instructions, and a corresponding sequence number for the first instruction. In one embodiment, the matching processor 102 can access a second instruction in the data memory 104 according to the instruction pointer, and execute the second instruction.

Advantageously, in one embodiment, each characteristic pattern can be represented by a data unit. As such, if a characteristic pattern of an ALP is changed, the corresponding data unit can be changed accordingly, which can be completed relatively quickly. Meanwhile, the configuration of the matching processor 102 does not need to be changed. Similarly, if a new protocol is added to the Internet protocol suite, one or more data units in the data memory 104 can be set to represent the corresponding characteristic patterns of the new protocol accordingly, which also can be performed relatively quickly.

Moreover, in one embodiment, the matching processor 102 can be, but does not have to be, realized by a hardware circuit in an FPGA, such that the speed of the pattern matching process can be increased. According to the discussion for the flowchart 400, the configuration of the matching processor 102 does not have the complication of compiling the HDL program as in a conventional protocol recognition system, and as a result the size of the hardware circuit can be reduced. Additionally, the data memory 104 can be, but is not limited to, a flash memory which is relatively cheap and small. As such, the size and the cost of the recognition system 100 can be reduced.

FIG. 5 illustrates a flowchart 500 of examples of operations performed by a recognition system, in accordance with one embodiment of the present invention. FIG. 5 is described in combination with FIG. 1, FIG. 2 and FIG. 3.

In block 502, the matching processor 102 can access a first data unit in a set of data units, e.g., 302_1-302_5, 304_1-304_4, 306_1-306_6, 308_1-308_3, etc. In one embodiment, the set of data units can be stored in the data memory 104 in a predetermined order. The predetermined order can be determined by a logical relationship of the set of data units.

In block 504, the matching processor 102 coupled to the data memory 104 can execute an instruction in the first data unit. In block 506, the matching processor 102 can determine a characteristic of the data packet 108 according to a result of the execution.

Furthermore, in block 508, the matching processor 102 can provide an address pointer according to the execution result, a total number of data units in the set of data units and a corresponding sequence number for the first data unit. The total number and the corresponding sequence number can be stored in the first data unit, e.g., the unit total number field 208 and the unit sequence number field 210, the unit total number field 216 and the unit sequence number field 218.

Accordingly, the present invention provides a recognition system for recognizing a data packet. The data packet can be, but is not limited to, an IP packet/datagram. The recognition system can include a data memory and a pattern-matching processor. The data memory can include multiple data units for storing multiple instructions respectively. Each instruction can be used to represent a characteristic pattern of an ALP. The matching processor can access a data unit in the data memory and execute an instruction stored in the data unit to determine whether the data packet matches the corresponding characteristic pattern. The matching processor can access one or more data units in a predetermined fashion according to the characteristic of the data packet. Consequently, the matching processor can determine the ALP of the data packet according to the data units.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A recognition system for recognizing a data packet, said system comprising:
   a non-transitory computer-readable storage medium having a plurality of characteristic groups stored thereon, a first characteristic group in said plurality of characteristic groups comprising a plurality of data units, a first data unit in said plurality of data units comprising:
      an instruction for determining a characteristic of said data packet;
      a total number of data units in said first characteristic group;
      a corresponding sequence number for said first data unit;
      a total number of groups in said plurality of characteristic groups; and
      a corresponding sequence number for said first characteristic group; and
   a matching processor coupled to said non-transitory computer-readable storage medium and for executing said instruction to generate a result, and for calculating an address pointer according to said result and according to said total number of said data units, said corresponding sequence number for said first data unit, said total number of said groups, and said corresponding sequence number for said first characteristic group.

2. The recognition system as claimed in claim 1, wherein said matching processor accesses a second data unit pointed to by said address pointer and executes an instruction stored in said second data unit.

3. The recognition system as claimed in claim 1, wherein said instruction is operable for comparing said data packet with predetermined content stored in said first data unit to generate said result.

4. The recognition system as claimed in claim 1, wherein said instruction comprises at least one parameter for the execution of said instruction.

5. The recognition system as claimed in claim 1, wherein said plurality of characteristic groups are stored in said non-transitory computer-readable storage medium according to a first logical relationship of said plurality of characteristic groups, and wherein said plurality of data units are stored in said first characteristic group according to a second logical relationship of said plurality of data units.

6. The recognition system as claimed in claim 5, wherein said first logical relationship comprises logical OR, and wherein said second logical relationship comprises logical AND.

7. The recognition system as claimed in claim 6, wherein said address pointer points to a second data unit stored next to said first data unit if a Boolean value of said result is true.

8. The recognition system as claimed in claim 6, wherein said address pointer points to a second data unit in a second characteristic group stored next to said first characteristic group if a Boolean value of said result is false.

9. The recognition system as claimed in claim 5, wherein said first logical relationship comprises logical AND, and wherein said second logical relationship comprises logical OR.

10. The recognition system as claimed in claim 9, wherein said address pointer points to a second data unit in a second characteristic group stored next to said first characteristic group if a Boolean value of said result is true.

11. The recognition system as claimed in claim 9, wherein said address pointer points to a second data unit stored next to said first data unit if a Boolean value of said result is false.

12. A method for recognizing a data packet comprising:
   accessing a first data unit in a plurality of characteristic groups stored in a non-transitory computer-readable storage medium, said characteristic groups comprising a first characteristic group, said first characteristic group comprising a plurality of data units, and said data units comprising said first data unit;
   executing an instruction in said first data unit using a processor to determine a characteristic of said data packet; and
   calculating an address pointer according to a result of said executing and according to a total number of data units in said plurality of data units, a corresponding sequence number for said first data unit, a total number of groups in said plurality of characteristic groups, and a corresponding sequence number for said first characteristic group.

13. The method as claimed in claim 12, further comprising:
accessing a second data unit pointed to by said address pointer; and
executing an instruction stored in said second data unit.

14. The method as claimed in claim 12, wherein said plurality of characteristic groups are stored in said non-transitory computer-readable storage medium according to a first logical relationship of said plurality of characteristic groups, and wherein said plurality of data units are stored in said first characteristic group according to a second logical relationship of said plurality of data units.

15. The method as claimed in claim 14, wherein said first logical relationship comprises logical OR, and wherein said second logical relationship comprises logical AND.

16. The method as claimed in claim 15, wherein said calculating of said address pointer comprises:
generating said address pointer pointing to a second data unit stored next to said first data unit if a Boolean value of said result is true.

17. The method as claimed in claim 15, wherein said calculating of said address pointer comprises:
generating said address pointer pointing to a second data unit in a second characteristic group stored next to said first characteristic group if a Boolean value of said result is false.

18. The method as claimed in claim 14, wherein said first logical relationship comprises logical AND, and wherein said second logical relationship comprises logical OR.

19. The method as claimed in claim 18, wherein said calculating of said address pointer comprises:
generating said address pointer pointing to a second data unit in a second characteristic group stored next to said first characteristic group if a Boolean value of said result is true.

20. The method as claimed in claim 18, wherein said calculating of said address pointer comprises:
generating said address pointer pointing to a second data unit stored next to said first data unit if a Boolean value of said result is false.

21. A recognition system for recognizing a data packet, said system comprising:
a data memory for providing a plurality of instructions respectively for determining a plurality of characteristics of said data packet, wherein said data memory comprises a plurality of characteristic groups, and wherein a first characteristic group in said plurality of characteristic groups comprises said plurality of instructions; and
a matching processor coupled to said data memory and for executing a first instruction of said plurality of instructions to generate a result, and for calculating an instruction pointer according to said result and according to a total number of instructions in said plurality of instructions, a corresponding sequence number for said first instruction, a total number of groups in said plurality of characteristic groups, and a corresponding sequence number for said first characteristic group.

22. The recognition system as claimed in claim 21, wherein said matching processor accesses a second instruction pointed to by said instruction pointer and executes said second instruction.

23. The recognition system as claimed in claim 21, wherein said result comprises a Boolean value.

24. The recognition system as claimed in claim 21, wherein said plurality of characteristic groups are stored in said data memory according to a first logical relationship of said plurality of characteristic groups, and wherein said plurality of instructions are stored in said first characteristic group according to a second logical relationship of said plurality of instructions.

25. The recognition system as claimed in claim 24, wherein said first logical relationship comprises logical OR, and wherein said second logical relationship comprises logical AND.

26. The recognition system as claimed in claim 24, wherein said first logical relationship comprises logical AND, and wherein said second logical relationship comprises logical OR.

* * * * *